United States Patent
Shi et al.

(10) Patent No.: US 10,129,498 B2
(45) Date of Patent: Nov. 13, 2018

(54) METHODS FOR TRANSMITTING AUDIO AND VIDEO SIGNALS AND TRANSMISSION SYSTEM THEREOF

(71) Applicant: Silergy Semiconductor Technology (Hangzhou) LTD, Hangzhou (CN)

(72) Inventors: Weifeng Shi, Hangzhou (CN); Jiangping Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 104 days.

(21) Appl. No.: 15/381,666

(22) Filed: Dec. 16, 2016

(65) Prior Publication Data
US 2017/0195608 A1    Jul. 6, 2017

(30) Foreign Application Priority Data

Dec. 30, 2015  (CN) .......................... 2015 1 1018213

(51) Int. Cl.
| | |
|---|---|
| *H04N 5/38* | (2006.01) |
| *H04N 5/44* | (2011.01) |
| *H04N 5/60* | (2006.01) |
| *H04N 7/088* | (2006.01) |
| *G09G 5/00* | (2006.01) |
| *H04N 7/04* | (2006.01) |

(52) U.S. Cl.
CPC .................. *H04N 5/38* (2013.01); *G09G 5/00* (2013.01); *H04N 5/44* (2013.01); *H04N 5/60* (2013.01); *H04N 7/04* (2013.01); *H04N 7/0887* (2013.01)

(58) Field of Classification Search
CPC .. H04N 5/38; H04N 5/44; H04N 5/60; H04N 5/602; H04N 7/0887

USPC ....... 348/723, 714, 705, 500, 512, 515, 553, 348/489, 482, 479, 477, 476, 473, 469, 348/467, 465, 464, 462, 461, 460, 459, 348/443, 441, 423, 423.1, 425.4, 426.1, 348/427.1; 370/366, 395.64, 463, 464, 370/465, 466, 467, 468, 470, 472, 473, 370/476, 479, 503, 522, 535, 536, 537, 370/541, 542; 725/51, 54, 95, 105, 118, 725/151, 136
See application file for complete search history.

(56) References Cited

U.S. PATENT DOCUMENTS 5,091,936 A * 2/1992 Katznelson .......... H04H 20/103
348/462
5,132,992 A   7/1992 Yurt et al.
(Continued)

*Primary Examiner* — Michael E Teitelbaum
(74) *Attorney, Agent, or Firm* — Michael C. Stephens, Jr.

(57) ABSTRACT

Transmitting audio and video signals, can include: detecting if the state of a video control signal has changed, where a video signal includes the video control signal and a video data signal; generating, if the state of the video control signal has not changed, a first serial data packet based on the video signal and an audio signal; generating, if the state of the video control signal has changed, a second serial data packet based on the video signal and the audio signal; transmitting over a serial link, an encoded data frame formed by encoding the first and second serial data packets in a predetermined encoding manner; decoding and de-serializing the encoded data frame to restore the video signal and the audio signal; and outputting the video signal to a video display circuit, and outputting the audio signal to an audio processor respectively.

15 Claims, 4 Drawing Sheets

(56) References Cited

U.S. PATENT DOCUMENTS

| | | | | |
|---|---|---|---|---|
| 5,483,538 A | * | 1/1996 | Rainbolt | H04N 7/04 348/513 |
| 5,579,239 A | | 11/1996 | Freeman et al. | |
| 5,842,171 A | * | 11/1998 | Greenwood | H04N 5/9268 348/E5.123 |
| 5,910,822 A | * | 6/1999 | Yamaguchi | H04N 7/085 348/476 |
| 5,946,307 A | * | 8/1999 | Ohkuwa | H04N 7/24 348/441 |
| 5,995,516 A | * | 11/1999 | Iwasaki | H04N 21/23602 348/474 |
| 6,188,987 B1 | * | 2/2001 | Fielder | H04N 21/23602 375/E7.271 |
| 6,233,253 B1 | * | 5/2001 | Settle | H04N 21/2365 370/474 |
| 6,269,107 B1 | * | 7/2001 | Jong | H04N 21/234318 348/423.1 |
| 6,272,149 B1 | * | 8/2001 | Fujisaki | H04N 7/52 370/474 |
| 6,278,739 B2 | * | 8/2001 | Enomoto | H04N 21/23602 348/722 |
| 6,418,140 B1 | * | 7/2002 | Matsui | H04N 7/52 348/423.1 |
| 6,539,001 B1 | * | 3/2003 | Kato | H04Q 11/0428 348/14.01 |
| 6,549,241 B2 | * | 4/2003 | Hiroi | H04N 5/4401 348/460 |
| 6,553,073 B1 | * | 4/2003 | Ogata | H04N 7/0806 348/E7.039 |
| 6,665,002 B2 | | 12/2003 | Liu | |
| 6,690,428 B1 | * | 2/2004 | Hudelson | H04N 21/23602 348/423.1 |
| 7,088,398 B1 | * | 8/2006 | Wolf | H04L 1/0057 348/423.1 |
| 7,283,566 B2 | * | 10/2007 | Siemens | H04L 1/0057 348/423.1 |
| 7,792,152 B1 | * | 9/2010 | Xu | G09G 5/006 348/423.1 |
| 2003/0169370 A1 | * | 9/2003 | Ejima | H04N 7/083 348/484 |
| 2004/0221056 A1 | * | 11/2004 | Kobayashi | G06F 3/14 709/232 |
| 2004/0221312 A1 | * | 11/2004 | Kobayashi | G06F 3/14 725/105 |
| 2007/0035611 A1 | | 2/2007 | Wu | |
| 2007/0200859 A1 | * | 8/2007 | Banks | G06F 3/14 345/520 |
| 2009/0303385 A1 | * | 12/2009 | Yamashita | H04N 7/015 348/500 |
| 2010/0007787 A1 | * | 1/2010 | Yamashita | H04N 5/232 348/441 |
| 2013/0208812 A1 | * | 8/2013 | Hudson | H04N 21/23602 375/240.26 |

* cited by examiner

| D0 | — | — | D7 | D8 | — | — | D20 | HS | VS | DE | CTL0 | CTL1 | CTL2 | CTL3 | WS | SDIN | UART | PCB |

FIG. 3

METHODS FOR TRANSMITTING AUDIO AND VIDEO SIGNALS AND TRANSMISSION SYSTEM THEREOF

RELATED APPLICATIONS

This application claims the benefit of Chinese Patent Application No. 201511018213.8, filed on Dec. 30, 2015, which is incorporated herein by reference in its entirety.

FIELD OF THE INVENTION

The present invention generally relates to the field of mobile serial communication signal transmission, and more particularly to transmission of audio and video signals.

BACKGROUND

Video and audio data of electronic products, such as car multimedia navigation systems, megapixel camera systems, and car rear seat entertainment facilities, can bring excellent experiences to customers. The requirements on the transmission of video and audio data have been higher with the rapid development of electronic information technology, and realization of fast transmission of audio-video data with fewer resources is a prominent direction of audio-video data transmission.

BRIEF DESCRIPTION OF THE DRAWINGS

FIG. 3 is a diagram of a second example packet format of a serial data packet provided, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
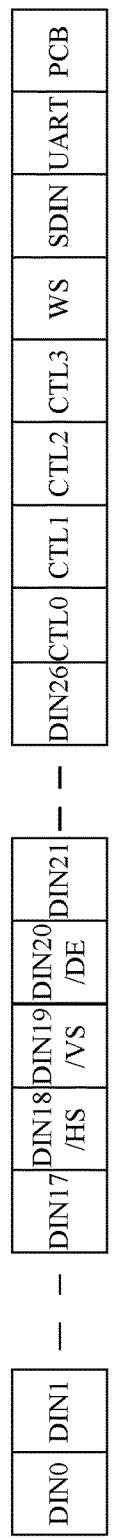
FIG. 1 is a diagram of an example data packet to be transmitted in an audio and video transmission system over a high-speed link.

Referring now to FIG. 1, shown is a diagram of an example data packet to be transmitted in an audio and video transmission system over a high-speed link. In this example, a transmitting device may serialize audio and video signals to a serial data pack, encode the serial data packet to form an encoded data frame, and then transmit the encoded data frame to a receiving device over the high-speed link. The receiving device may decode the encoded data frame, and restore the corresponding audio and video signals. In this transmission system, only one bit of the data packet may be allocated to the audio signal, as shown in FIG. 1, which is a standard data packet to be transmitted over the high-speed link in an audio and video transmission system.

For example, the data packet is a 32-bit packet whose video segment can occupy 27 bits, where DIN0, DIN1, . . . DIN17 and DIN21, DIN22 . . . DIN23 are the bits occupied by the 24-bit video data signal in the video signal, and DIN18, DIN19, DIN20 are the video control signal bits of the video signal. The video control signal bits are horizontal synchronizing signal bit HS, vertical synchronizing signal bit VS, and data enabling control bit DE. The audio information segment in the data packet may only occupy 1 bit AUD, and the audio data signal of the audio signal and the video data signal of the video data signal may both be transmitted through a bit. The data packet can also include two auxiliary signal control bits CTL1 and CTL2, one forward control channel bit UART, and one parity bit PCB.

Since the example audio and video transmission system described above only allocates one bit to the audio signal in the data packet, and the receiving device recovers the audio data and the audio clock upon receiving such a data packet, the recovery scheme is relatively complicated. Also, improvements of the audio sampling rate and word lengths of the audio data may be substantially limited in such systems. In particular, when transmitting an audio signal, a data packet (which is transmitted via a serial link after being encoded in a predetermined manner) transmitted in a transmission system may be configured with only one bit for the audio signal, and an audio data signal and an audio sampling rate signal can both be both transmitted through this bit. Thus, the recovery scheme can become very complicated when the audio clock signal is recovered based on the information of this bit is received by a receiving circuit, while it is may be unable to obtain a relatively high audio sampling rate and a relatively large audio word length.

As described herein, the audio signal may refer to an audio-related signal to be transmitted (e.g., one or all of an audio data signal, an audio sampling rate signal and an audio clock signal, etc.). The audio sampling rate signal may refer to a signal that characterizes the audio sampling rate, and the audio clock signal may also represent only the signal of the audio clock. Also, the video signal may refer to a video-related signal to be transmitted, such as at least one or all of a video data signal (e.g., RGB data signal), a video clock signal, and a video control signal. The video control signal can include a horizontal synchronizing signal, a vertical synchronizing signal, and a data enable signal, and the video clock signal may be a signal representative of the video clock. Further, the data packet may refer to a packet can be transmitted over a serial link after being encoded in a predetermined manner. Also, the data packet transmitted in the system can imply a data packet transmitted over a serial link after being encoded in a predetermined manner, whereby the data packet may be a serialized serial data packet.

The state of the video control signal in the video signal may only change when the video data signal is in an inactive state, but may remain unchanged when the video data signal is in the active state. The bits occupied by the video control signal in the data packet can be replaced with the bits having other functions during the transmission when the video data signal is in the active state. Also, the bits occupied by the audio data signal in the data packet can be replaced with the bits having other functions when the video data signal is in the inactive state, such that the bits of the data packet can be rationally allocated. In this way, certain embodiments can provide methods and systems for transmitting audio and video signals by appropriately configuring the bits in the data packet according to the state of the video control signal, such that two bits in the data packet can be allocated to the audio signal during the transmission process. For example, each of the audio data signal and the audio sampling rate signal in the audio signal may occupy one bit.

In various embodiments, methods and/or systems for transmitting audio and video signals, can include: (i) detecting, by a detection circuit, if the state of a video control signal has changed, where a video signal includes the video control signal and a video data signal; (ii) generating, by a transmitting circuit if the state of the video control signal has not changed, a first serial data packet based on the video signal and an audio signal, where the audio signal includes an audio data signal and an audio sampling rate signal that occupy one bit in the first serial data packet to form an audio information segment of the first serial data packet, and where a video information segment of the first serial data packet includes the video data signal; (iii) generating, by the transmitting circuit if the state of the video control signal has changed, a second serial data packet based on the video signal and the audio signal, where each of the audio data signal and the audio sampling rate signal occupies one bit in the second serial data packet to form the audio information segment of the second serial data packet, and where the video information segment of the second serial data packet includes the video control signal, and a plurality of special character bits; (iv) transmitting, to a receiving circuit over a serial link, an encoded data frame formed by encoding the first and second serial data packets in a predetermined encoding manner; (v) decoding and de-serializing, by the receiving circuit, the encoded data frame to restore the video signal and the audio signal; and (vi) outputting the video signal to a video display circuit, and outputting the audio signal to an audio processor respectively, where the receiving circuit detects whether the currently received data packet is the first serial data packet or the second serial data packet based on the plurality of special character bits.

In certain embodiments, a method for transmitting audio and video signals can include, at step 1, detecting if the state of the video control signal is changed or not. The video control signal can include a horizontal synchronizing signal, a vertical synchronizing signal, and a data enable signal. Thus, whether the video data signal is in the active state or in the inactive state can be determined by detecting if the state of the video control signal is changed or not because the horizontal synchronizing signal, the vertical synchronizing signal, and the data enable signal may only change when the video data signal is in the inactive state. Only when the change of the state of the video control signal is detected, may become necessary for the transmitting circuit to send the change information of the video control signal to the receiving circuit, and otherwise this will not be sent. Therefore, the configuration of the data packet in the transmission system can be determined by detecting whether the state of the video control signal is changed or not.

In certain embodiments, a method for transmitting audio and video signals can include, at step 2, determining the type of the data packet to be transmitted in the system according to the detection results in step 1; that is, selecting the data packet to be transmitted. For example, the transmitting circuit can generate a first serial data packet based on the video signal and the audio signal if the state of the video control signal is not changed. In the first serial data packet, each of the audio data signal and the audio sampling rate signal may occupy one bit to form an audio information segment of the first serial data packet, and an video information segment of the first serial data packet may only include an video data signal of the video signal. Here, the audio information segment may refer to an information segment formed by bits arranged for the audio signal in the first serial data packet, that is, all the audio signals may only be located in the audio information segment. Also, the video information segment can refer to the information segment formed by bits arranged for the video signal in the first serial data packet, that is, all the video signal may only be located in the video information segment.

If the state of the video control signal changes, the transmitting circuit can generate a second serial data packet based on the inputted video signal and the audio signal. Each of the audio data signal and the audio sampling rate signal can occupy one bit in the second serial data packet to form an audio information segment of the second serial data packet. The video information segment of the second serial data packet can include the video control signal, and a number of special character bits. The special characters indicated in these special character bits can include bit combinations which may not be obtained by encoding the first serial data packet or the second serial data packet in a predetermined encoding manner. The video information segment in the second serial data packet can in some cases only include the video control signal, but not include the video data signal. Also, some bits originally configured for the video data signal can be arranged as special character bits, such that the receiving circuit may detect the change of the state of the current video control signal according to these special character bits, and determine that the second serial data packet is transmitted currently. The audio signal can be synchronous with the video signal under the control of the video clock signal for transmitting the audio signal and the video signal with high speed.

In certain embodiments, a method for transmitting audio and video signals can include, at step 3, transmitting an encoded data frame that is formed by encoding the first and second serial data packets in a predetermined encoding manner to the receiving circuit over a serial link. For example, the serial link may be a high-speed serial link. The data packets may be encoded before being transmitted over the serial link, and then the receiving circuit may decode the encoded data frame being transmitted over the serial link. For example, the encoding manner can correspond to the decoding manner. Thus for example, if the predetermined encoding manner is 8B/10B encoding, the predetermined decoding manner can also accordingly be 8B/10B decoding. Similarly, if the predetermined encoding manner is 9B/10B encoding, the predetermined decoding manner can also accordingly be 9B/10B decoding. The specific encoding and decoding methods can be decided by bits of the data packets to be transmitted. For example, if the number of bits of a data packet is a multiple of 8, then 8B/10B can be selected, and if the number of bits of the data packet is a multiple of 9, then 9B/10B may be selected.

In certain embodiments, a method for transmitting audio and video signals can include, at step 4, decoding and de-serializing the encoded data frame in order to restore the video signal and the audio signal by the receiving circuit, and respectively outputting the video signal and the audio signal to the video display circuit and the audio processor.

The receiving circuit can detect whether the currently received data packet is the first serial data packet or the second serial data packet based on the information of the special character bits, and can then carry out corresponding process.

The receiving circuit may restore the audio clock signal of the audio signal based on the information of the bit occupied by the audio sampling rate signal and the information of the forward control channel signal bit, such that the clock recovery scheme may be relatively simple. In particular embodiments, the transmitting circuit can refer to a circuit or structure that transmits data to the serial link in the audio and video signal transmission system, and the receiving circuit can refer to a circuit or structure that receives data from the serial link in the transmission system.

In certain embodiments, when the first and second serial data packets are formed, the transmitting circuit may also receive a forward control channel signal. Thus, the first and second serial data packets can both include a forward control channel signal bit that is configured for the control signal source to transmit control signals to the receiving circuit and its peripherals. The forward control channel signal can include a control signal for determining the channel number and the word length of the audio data signal. Further, a parity bit may be arranged in both of the first and second serial data packets. In order to enable other functions of the transmission system, the transmitting circuit may also receive at least one auxiliary control signal, such that both of the first and second serial data packets include at least one auxiliary control signal bit.

Figure 2:
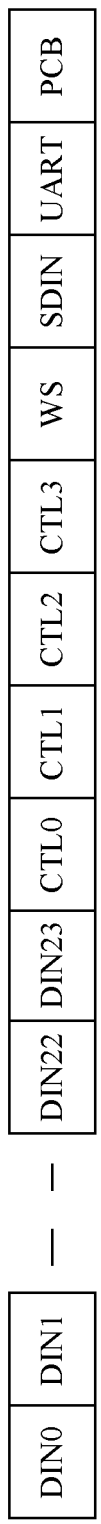
FIG. 2 is a diagram of a first example packet format of a serial data packet, in accordance with embodiments of the present invention.

Referring now to FIGS. 2 and 3, shown are diagrams of example packet formats of serial data packets, in accordance with embodiments of the present invention. In these examples, the first and second data packets may both be 32-bit data packets, where the video data signal to be transmitted is a 24-bit signal. For example, the first serial data packet may be formed by a 24-bit video data signal bit (e.g., DIN0-DIN23), four auxiliary signal bits (e.g., CTL0-CTL3), one audio sampling rate signal bit (e.g., WS), one audio data signal bit (e.g., SDIN), one forward control channel bit (e.g., UART) and one parity bit (e.g., PCB). Also for example, the second serial data packet may be formed by a eight special character bits (e.g., D0-D7), thirteen idle bits (e.g., D9-D20), three video control signal bits (e.g., HS, VS, and DS), four auxiliary signal bits (e.g., CTL0-CTL3), one audio sampling rate signal bit (e.g., WS), one audio data signal bit (e.g., SDIN), one forward control channel bit (e.g., UART) and one parity bit (e.g., PCB), where three video control signal bits can be arranged for the horizontal synchronizing signal, the vertical synchronizing signal, and the data enable signal, respectively.

Because the audio sampling rate signal may independently occupy one bit to form audio sampling rate bit WS in the first and second serial data packets, the receiving circuit can restore the clock signal of the audio signal in a relatively simple and fast way according to the information of the bit WS. Also, audio sampling rate bit WS may also serve as a frame start bit, and the audio sampling rate bit WS may further be a channel selection bit of the audio data signal if the number of channels of the audio data signal is 2. Because audio sampling rate bit WS can be used as either the frame start bit or the channel selection bit, time slots can be used effectively such that no redundancy bits need be inserted between channels of the audio data signal, which can result in a higher audio sampling rate and a longer word length of the audio data.

In particular embodiments, it can be determined whether the current data packet to be transmitted is the first serial packet excluding the video control signal, or the second serial data packet including the video control signal but excluding the video data signal, by detecting if the state of the video control signal is changed or not. Because each of the audio sampling rate signal and the audio data signal in the first and second serial data packets may occupy one bit, and the audio sampling rate bit can be used as either the frame start bit and or the channel selection bit, the clock signal of the audio signal can be relatively easily recovered by the receiving circuit. In this way, the audio sampling rate and the word length of the audio data signal can be increased.

Figure 4:
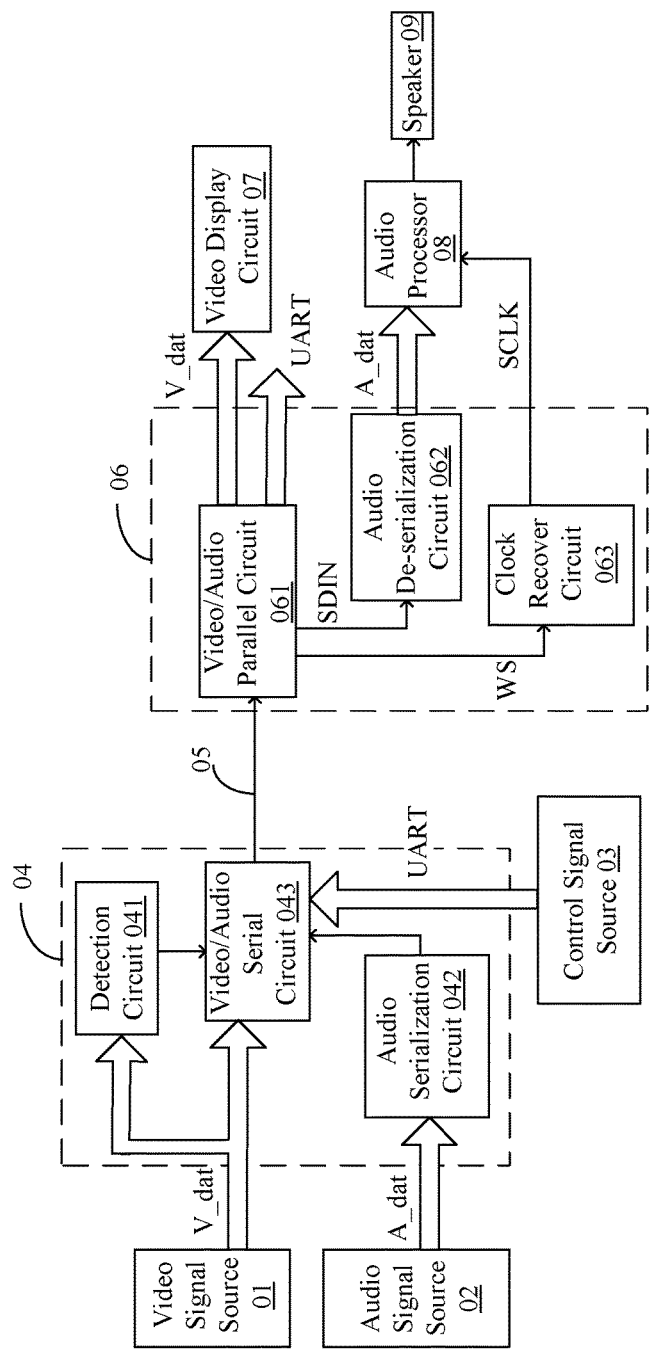
FIG. 4 is a block diagram of an example audio and video signal transmission system, in accordance with embodiments of the present invention.

Referring now to FIG. 4, shown is a block diagram of an example audio and video signal transmission system, in accordance with embodiments of the present invention. Audio signal A_dat to be transmitted in this example transmission system may be provided by audio signal source 02, which can include an audio data signal and an audio sampling rate signal. Video signal V_dat may be provided by video signal source 01, which can include a video control signal formed by a horizontal synchronizing signal, a vertical synchronizing signal, a data enable signal, and a video data signal. The system can include transmitting circuit 04, serial link 05, and receiving circuit 06. Transmitting circuit 04 can detect whether the state of the video control signal in inputted video signal V_dat is changed or not. If the state of the video control signal is not changed, the transmitting circuit can generate a first serial data packet based on inputted video signal V_dat and audio signal A_dat, such that the audio data signal and the audio sampling rate signal may each occupy one bit in the first serial data packet to form the audio information segment of the first serial data packet.

The video information segment of the first serial data packet can include only the video data signal of the video signal. If the state of the video control signal changes, transmitting circuit 06 can generate a second serial data packet based on inputted video signal V_dat and audio signal A_dat, such that each of the audio data signal and the audio sampling rate signal occupies one bit in the second serial data packet to form an audio information segment of the second serial data packet. The video information segment of the second serial data packet can include the video control signal, and a number of special character bits.

The encoded data frame formed by encoding the first and second serial data packets in a predetermined encoding manner can be transmitted to receiving circuit 06 over serial link 05. Receiving circuit 06 can decode and de-serialize the received encoded data frame to recover video signal V_dat and audio signal A_dat, and may output video signal V_dat and audio signal A_dat to video display circuit 07 and audio processor 08, which can finally output a signal to drive speaker 09. For example, receiving circuit 06 can determine whether the currently received data packet is the first serial data packet or the second serial data packet based on the information of the special character bits.

In this particular example, the transmitting circuit can also receive forward control channel signal UART when forming the first and second serial data packets, such that each of the first and second serial data packets can include one forward control channel signal bit UART for the control signal source to transmit control signals to the receiving circuit and its peripheral devices. The forward control channel signal can include a control signal that determines the number of channels and the word length of the audio data signal. In addition, control signal source 03 may send at least one auxiliary control signal to transmitting circuit 05, such that at least one auxiliary control signal bit is also included in the first and second serial data packets.

Still referring to FIG. 4, transmitting circuit 04 can include detection circuit 041, audio serialization circuit 042, video/audio serial circuit 043, and an encoding circuit. Detection circuit 042 can receive a video control signal in video signal V_dat to detect whether the video control signal is changed or not. Audio serialization circuit 042 can receive parallelized audio signal A_dat outputted by audio signal source 02, and may serialize the audio signal to form a serialized audio signal.

When detection circuit 041 detects that the state of the video control signal has not changed, video/audio serial circuit 043 can control the serialized audio signal to be synchronous with the video signal according to a clock signal of the video signal, and then serializes the serialized audio signal, the parallelized video data signal, and the forward control channel signal, in order to generate the first serial data packet. When detection circuit 041 detects that the state of the video control signal has not changed, video/audio serial circuit 043 can control the serialized audio signal to be synchronous with the video signal according to the clock signal of the video signal, and then serializes the serialized audio signal, the parallelized video control signal, a number of special characters, and the forward control channel signal, in order to generate the second serial data packet.

The encoding circuit can encode the first serial data packet and the second serial data to form the encoded data frame. The information of the special character bit can include the bit combinations that may not be obtained by encoding the first serial data packet or the second serial data packet in a predetermined encoded manner. Receiving circuit 06 can also include a decoding circuit, video/audio de-serialization circuit 061, audio de-serialization circuit 062, and clock recovery circuit 063. The decoding circuit can decode the encoded data frame to recover the first and second serial data packets. Video/audio de-serialization circuit 061 can de-serialize the first and second serial data packets to recover the parallelized video signal, audio signal, and forward control channel signal UART. The audio signal can include serialized audio data signal SDIN and audio sampling rate signal WS, and the recovered video signal may be transmitted to video display circuit 07.

Audio de-serialization circuit 062 can recover the serial audio data signal to the parallel audio data signal, and transmit the recovered audio data signal to audio processor 08. Clock recovery circuit 063 can receive audio sample rate signal WS, and may recover clock signal SCLK of the audio signal based on the information of audio sampling rate signal WS and forward control channel signal UART, and may output the clock signal of the audio signal to audio processor 08.

In this way, it can be determined whether the current data packet to be transmitted is the first serial packet excluding the video control signal, or the second serial data packet including the video control signal but excluding the video data signal, by detecting if the state of the video control signal is changed or not. Because each of the audio sampling rate signal and the audio data signal in the first and second serial data packets may occupy one bit, and the audio sampling rate bit can be used as either the frame start bit or the channel selection bit, the clock signal of the audio signal can be relatively easily recovered by the receiving circuit. Thus, the audio sampling rate and the word length of the audio data signal can be increased relative to traditional approaches.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method for transmitting audio and video signals, the method comprising:
    a) detecting, by a detection circuit, if the state of a video control signal has changed, wherein a video signal comprises said video control signal and a video data signal;
    b) generating, by a transmitting circuit if said state of said video control signal has not changed, a first serial data packet based on said video signal and an audio signal, wherein said audio signal comprises an audio data signal and an audio sampling rate signal that occupy one bit in said first serial data packet to form an audio information segment of said first serial data packet, and wherein a video information segment of said first serial data packet comprises said video data signal;
    c) generating, by said transmitting circuit if said state of said video control signal has changed, a second serial data packet based on said video signal and said audio signal, wherein each of said audio data signal and said audio sampling rate signal occupies one bit in said second serial data packet to form said audio information segment of said second serial data packet, wherein said video information segment of said second serial data packet comprises said video control signal, and a plurality of special character bits, and wherein said video control signal comprises a horizontal synchronizing signal, a vertical synchronizing signal, and a data enable signal;
    d) transmitting, to a receiving circuit over a serial link, an encoded data frame formed by encoding said first and second serial data packets in a predetermined encoding manner;
    e) decoding and de-serializing, by said receiving circuit, said encoded data frame to restore said video signal and said audio signal; and
    f) outputting said video signal to a video display circuit, and outputting said audio signal to an audio processor respectively, wherein said receiving circuit detects whether the currently received data packet is said first serial data packet or said second serial data packet based on said plurality of special character bits.

2. The method of claim 1, wherein said transmitting circuit further receives a forward control channel signal when forming said first and second serial data packets, such that each of said first and second serial data packets includes one forward control channel signal bit, and said forward control channel signal determines a number of channels and a word length of said audio data signal.

3. The method of claim 2, wherein a parity bit is arranged in both of said first and second serial data packets.

4. The method of claim 2, wherein said transmitting circuit further receives at least one auxiliary control signal such that both of said first and second serial data packets comprises at least one auxiliary control signal bit.

5. The method of claim 4, wherein the bits occupied by said audio sampling rate signal serve as an audio frame start bit.

6. The method of claim 5, wherein when said number of channels of said audio data is 2, said bits occupied by said audio sampling rate signal further serves as a channel selection bit.

7. The method of claim 2, wherein said receiving circuit restores said audio clock signal of said audio signal based on said bit occupied by said audio sampling rate signal and said forward control channel signal bit.

8. The method of claim 2, wherein the information of said special character bits comprises bit combinations not obtained by encoding said first serial data packet or said second serial data packet in said predetermined encoding manner.

9. The method of claim 2, wherein said predetermined encoding manner is an 8B/10B encoding manner, and said predetermined decoding manner is an 8B/10B decoding manner.

10. The method of claim 9, wherein:
a) said first and second serial data packets are both 32-bit data packets;
b) said first serial data packet comprises twenty-four video data signal bits, four auxiliary signal bits, one audio sampling rate signal bit, one audio data signal bit, one forward control channel bit and one parity bit; and
c) said second serial data packet comprises eight special character bits, thirteen idle bits, three video control signal bits, four auxiliary signal bits, one audio sampling signal bit, one audio data signal bit, one forward control channel bit and one parity bit, said three video control signal bits allocated to said horizontal synchronizing signal, said vertical synchronizing signal, and said data enable signal.

11. The method of claim 2, wherein said audio signal is synchronous with said video signal under the control of said video signal.

12. A system for transmitting audio and video signals, the system comprising:
a) a transmitting circuit configured to detect if the state of a video control signal has changed, wherein a video signal comprises said video control signal and a video data signal;
b) said transmitting circuit being configured to generate, if said state of said video control signal has not changed, a first serial data packet based on said video signal and an audio signal, wherein said audio signal comprises an audio data signal and an audio sampling rate signal that occupy one bit in said first serial data packet to form an audio information segment of said first serial data packet, and wherein a video information segment of said first serial data packet comprises said video data signal;
c) said transmitting circuit being configured to generate, if said state of said video control signal has changed, a second serial data packet based on said video signal and said audio signal, wherein each of said audio data signal and said audio sampling rate signal occupies one bit in said second serial data packet to form said audio information segment of said second serial data packet, wherein said video information segment of said second serial data packet comprises said video control signal, and a plurality of special character bits, and wherein said video control signal comprises a horizontal synchronizing signal, a vertical synchronizing signal, and a data enable signal;
d) a receiving circuit configured to receive over a serial link, an encoded data frame formed by encoding said first and second serial data packets in a predetermined encoding manner;
e) said receiving circuit being configured to decode and de-serialize said encoded data frame to restore said video signal and said audio signal; and
f) said receiving circuit being configured to output said video signal to a video display circuit, and to output said audio signal to an audio processor respectively, wherein said receiving circuit detects whether the currently received data packet is said first serial data packet or said second serial data packet based on said plurality of special character bits.

13. The system of claim 12, wherein said transmitting circuit is configured to receive a forward control channel signal when forming said first and second serial data packets, such that each of said first and second serial data packets comprises one forward control channel signal bit, and said forward control channel signal determines a number of channels and a word length of said audio data signal.

14. The system of claim 13, wherein said transmitting circuit comprises:
a) a detection circuit configured to receive said video control signal to detect if said video control signal has changed;
b) an audio serialization circuit configured to receive a parallelized audio signal outputted by an audio signal source, and to serialize said audio signal to form a serialized audio signal;
c) a video/audio serial circuit configured, when said detection circuit detects that the state of said video control signal has not changed, to control said serialized audio signal to be synchronous with said video signal based on a clock signal of said video signal, and to serialize said serialized audio signal, said parallelized video control signal, and said forward control channel signal, to generate said first serial data packet;
d) said video/audio serial circuit being configured, when said detection circuit detects that the state of said video control signal has changed, to control said serialized audio signal to be synchronous with said video signal based on said clock signal of said video signal, and to serialize said serialized audio signal, said parallelized video control signal, a plurality of special characters and said forward control channel signal, to generate said second serial data packet; and
e) an encoding circuit configured to encode said first and second serial data packets to form said encoded data frame, wherein said plurality of special characters comprises bit combinations not obtained by encoding said first serial data packet or said second serial data packet in said predetermined encoding manner.

15. The system of claim 13, wherein said receiving circuit comprises:
a) a decoding circuit configured to decode said encoded data frame to recover said first and second serial data packets;
b) a video/audio de-serialization circuit configured to de-serialize said first and second serial data packets to recover said parallelized video signal, said audio signal, and to transmit said recovered video signal to said video display circuit;
c) an audio de-serialization circuit configured to recover said serial audio data signal to said parallel audio data signal, and to transmit said recovered audio data signal to said audio processor; and d) a clock recovery circuit configured to receive said audio sampling rate signal and recovers said clock signal of said audio signal based on audio information obtained according to said audio sampling rate signal and said forward control channel signal, and to output said clock signal of said audio signal to said audio processor.

\* \* \* \* \*